United States Patent Office 3,092,498
Patented June 4, 1963

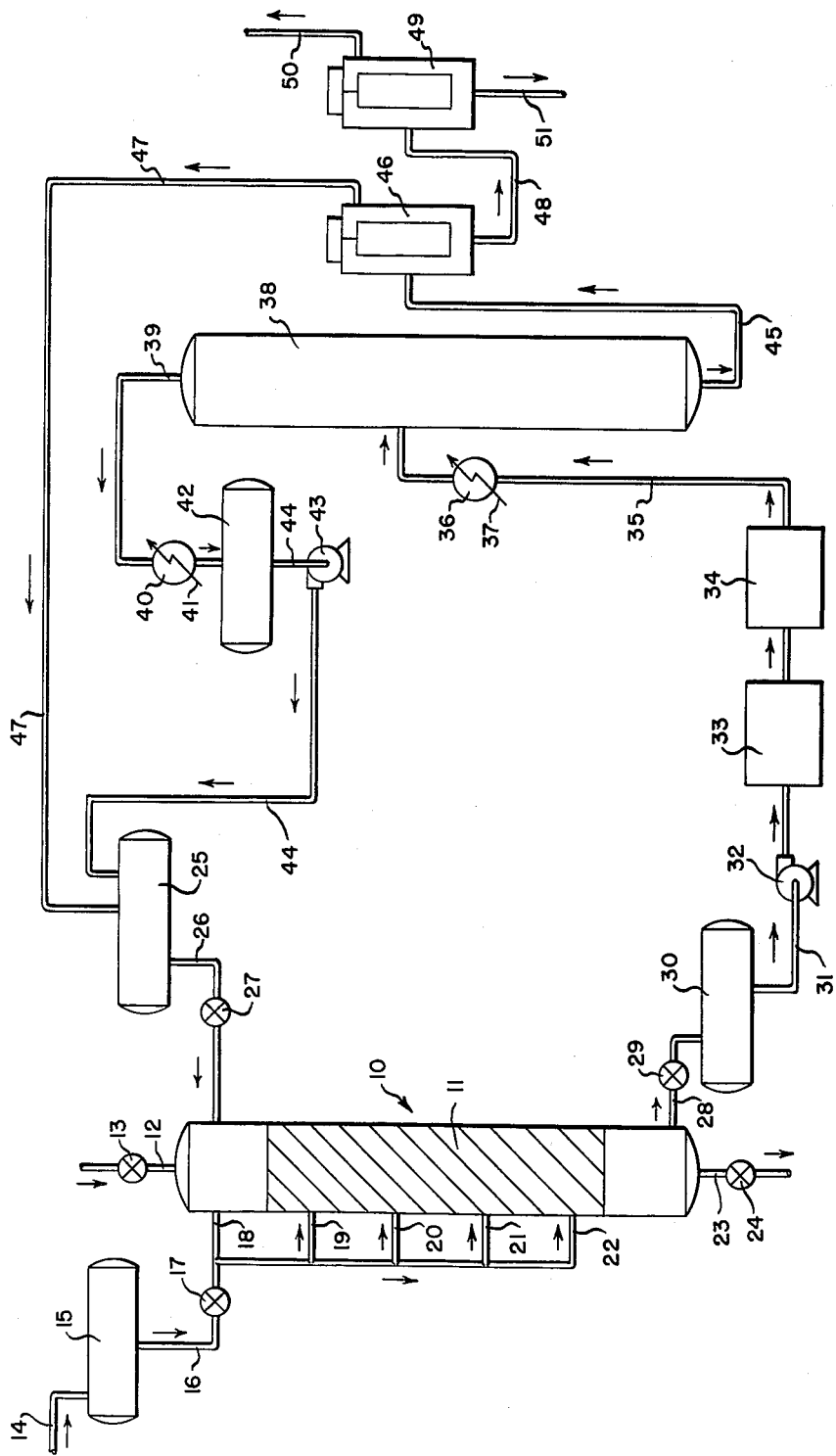

3,092,498
PROCESS FOR OBTAINING A FLAVOR-BEARING FRACTION OF COFFEE
William V. White, Spring Valley, and Matthew Hamell, Orangeburg, N.Y., and Ellen Danielczik, Jersey City, N.J., assignors to General Foods Corporation, White Plains, N.Y., a corporation of Delaware
Filed May 27, 1960, Ser. No. 32,384
4 Claims. (Cl. 99—71)

This invention relates to a process for obtaining a flavor-bearing fraction of coffee. More particularly it relates to a process for obtaining from coffee a flavor-bearing fraction which is substantially free of caffeine and which may contain a minimum of non-aromatic oils.

As is well known to those skilled-in-the-art, coffee beans may be considered to be made up of several components including water-soluble components, caffeine, a flavor-bearing fraction, an aroma-bearing fraction, a non-aromatic oil fraction, and the fibrous supporting structure of the bean. During the normal course of manufacture of coffee beverage, the caffeine, the flavor-and-aroma-bearing fractions, the non-aromatic oils and the solubles may be extracted into the water and the fibrous material left behind as a residue. In commercial operations, it has heretofore been attempted to separate the various components to permit reblending thereof to obtain a product coffee which possesses the highest degree of consumer acceptance. For example, it has been common to attempt to extract oils from coffee by expressing. Caffeine has been extracted to produce decaffeinated coffees—commonly by solvent treatment of aqueous coffee liquors. Aromatics have been obtained from coffee by various techniques including heating or pressing as well as extraction.

The recovery of the flavor-bearing fraction of coffee has been effected in known prior-art processes by expressing coffee oil which was then subjected to processing to recover the flavor-bearing fraction from the expressed oil.

While there has been some degree of satisfaction with the several prior art techniques for obtaining a flavor-bearing fraction of coffee it is generally recognized that there exists no completely satisfactory technique for efficient and economical recovery of the flavor-bearing fraction in pure state substantially free of other undesirable components. The flavor oil obtained by pressing for example is deficient in that the high temperature necessarily obtained volatilizes the lighter components of the aroma and degrades the heavier components. Neither expressing nor solvent extraction, as heretofore employed, permit attainment of a flavor-bearing fraction giving the flavor characteristics of brewed coffee.

It is an object of this invention to provide a technique for recovering the flavor-bearing fraction of coffee in a form substantially free of caffeine and non-aromatic oil. It is another object of this invention to recover from coffee a flavor-bearing component, not attainable by any other known technique, which when added to a soluble coffee will permit attainment of a coffee beverage possessing the flavor of brewed coffee. Other objects will be apparent to those skilled-in-the-art on inspection of the following specification and the accompanying drawing.

In accordance with certain aspects of this invention, a flavor-bearing fraction substantially free of caffeine and containing a minimum of non-aromatic oil may be recovered from coffee by wetting the coffee, contacting the wetted coffee with a flavor-extracting solvent thereby extracting from said coffee a flavor-bearing fraction substantially free of caffeine and containing a minimum of non-aromatic oil, and recovering said flavor-bearing fraction from said extract.

Although it may be possible to attain the hereinbefore noted objective by using roasted whole beans as charge material, the advantages of this invention are most apparent when using ground roasted coffee. Commonly the ground roasted coffee which may be employed may have a moisture content of 1%–3%; under certain conditions it may be as high as 8%; and 10% is probably the maximum moisture content encountered in practice of normal coffee production.

The ground roasted coffee charged to the process of this invention has an average particle size which may for example range from 10 mesh to 20 mesh (U.S. Standard). Although it may be possible to carry out the process of this invention in various pieces of equipment, including any one of numerous mixers, e.g. a revolving drum mixer, it is found particularly convenient to employ a fixed bed of coffee in a percolator. A typical percolater which may be employed in practice of this invention may have a height equal to thirty times its diameter; the bed of coffee within the percolator may occupy substantially the entire length of the percolator.

Optimum quality of the desired products of this invention may be attained by the use of an inert atmosphere such as nitrogen or preferably carbon dioxide at least in those steps of the process carried out at atmospheric pressure; and the equipment may be provided with means for providing inert gas.

In practice of this invention, the preferably ground roasted coffee will be wet with aqueous wetting liquor, preferably water. In the preferred embodiment, the mass of ground roasted coffee may be wet with an amount of water sufficient to effect saturation of the coffee; commonly this may be done by adding approximately 100% of water to the coffee (this may provide a product wet mix which is e.g. 50%–55% water).

It is a feature of this invention when the ground roasted coffee is maintained in a gravity-packed bed in a percolator, that wetting may conveniently be done by passing water upwardly or preferably downwardly through the percolator. In one embodiment the coffee may be totally submerged in water or other aqueous liquid, and after a time which is insufficient to permit extraction of solubles by the aqueous liquid, the liquid may be drained from the coffee. This readily permits attainment of a bed of coffee which is saturated with water.

Preferably wetting may be effected by addition to the coffee of the desired amount of water to attain a wet coffee containing no free water.

Although water may be the preferred wetting liquor, an aqueous extract of coffee may be employed. It is also a feature of this invention that wetting may be effected with aqueous liquors which contain, typically in amount sufficient to saturate the liquor, an activating composition. When the activating composition is ammonia or ammonium hydroxide, it is found that the product flavor-bearing fraction may be more intense. Activating compositions typified by methyl acetate (for example in amount sufficient to saturate the aqueous wetting liquor) may be employed; and when this is done the yield of flavor-bearing fraction may be increased by as much as 50%–75%.

It will be apparent that even after the bed is permitted to drain free of whatever water may be drained therefrom, the bed may retain water which may have been adsorbed into the individual particles of coffee as well as water which may be retained within the bed because of surface tension and/or other forces. Such a bed may be referred to as a wet, superficially dry bed.

It is a feature of this invention that the water may be employed at a temperature of 32° F.–125° F., preferably less than about 75° F. Commonly water at tap water temperature or water at room temperature may be employed. If the temperature of the water be above the preferred upper limit, it will be found that there is an increasingly greater tendency to obtain a less desirable product.

The time of contact of the water with the coffee may be varied if desired. Commonly it may take 15–30 minutes to attain the desired homogeneity or equilibrium.

To the pre-wet mass of coffee which has been drained free of excess water, if any, there is added an aroma-extracting solvent. The preferred flavor-extracting solvents are non-polar liquids which preferably may have a boiling point less than 160° F. (Use of solvents having such a boiling point permits operation of the distillation-recovery steps with minimum degree of flavor degradation.) Preferably these solvents may be characterized by a substantial insolubility in water, low solubility for water, and a low solubility for caffeine, under the conditions of extraction. The preferred flavor-extracting solvents which may be employed include low molecular weight liquid aliphatic hydrocarbons and mixtures thereof, typically butane, pentane, hexane, or petroleum ether (a mixture of low boiling aliphatic hydrocarbons having a boiling range of about 68° F.–104° F.). Another solvent which may be employed is methyl chloride; mixtures of petroleum ether and methylene chloride may be employed. One such mixture which may be suitable is a mixture containing 50% by weight methylene dichloride and 50% petroleum ether. When methyl chloride (B.P. 11° F.) is employed, the system will be maintained under sufficient pressure to permit operation in liquid phase at the prevailing temperature.

A second group of aroma-extracting solvents which may be employed may include those solvents which will extract the flavor-bearing fraction containing a minimum of non-aromatic oil under the conditions of operation, but which may also extract small amounts of dissolved solids. Typical of this group may be noted methylene dichloride, furan, and lower molecular weight ethers including ethyl ether.

It is a feature of this invention that the solvent employed need not be anhydrous. In fact it is preferred to use a solvent substantially saturated with water; the noted solvents may commonly contain of the order of not more than about 1 or 2% water.

In practice of this invention, the solvent, preferably in amount of 100 to 300 or more, say 150 parts of solvent per 100 parts of prewet coffee (the latter expressed on a dry-basis) may be contacted with the coffee. In the preferred embodiment the solvent may be passed upwardly or preferably downwardly through the prewetted bed of roasted ground coffee. During this contacting operation, the temperature of operation will be maintained below the boiling point (under the pressure of operation) of the solvent and preferably as much as 20° F. or 30° F. or more below that point. Preferably the temperature of extraction may be 60° F.–100° F., typically about 80° F. Use of temperatures above this preferred range may require undesirably high pressure of operation. Lower temperature may result in undesirably lower yields.

The solvent withdrawn from the column may be found to contain a flavor-bearing fraction in which may be found the flavor-bearing components of the coffee. Commonly the flavor-bearing components will be present in the solvent in amount of 1% to 3%, say 2%. The solvent, especially when it is an aliphatic hydrocarbon, methyl chloride, or a mixture of at least 50% aliphatic hydrocarbon with methylene dichloride, will be substantially entirely free of caffeine, which typically will be present in amount less than about 0.03%.

The recovery of the flavor-bearing fraction from the extract may be effected by distilling the solvent therefrom preferably at sub-atmospheric pressure. The distillation will preferably be effected at moderate temperatures less than the boiling point of the light aromatic components thus minimizing loss by entrainment, volatilization, etc. Typically distillation of the solvent will permit attainment (based on 100 parts by weight of ground roasted charge coffee) of 3% to 5%, say 3.5% parts by weight of an extracted flavor-bearing fraction. Commonly this fraction may be a light colored highly aromatic oil.

Preferably distillation of the flavor-bearing extract may be effected at e.g. 50° F.–60° F. at 70–100 mm. Hg when petroleum ether is employed. It will be apparent that the distillation temperature may vary depending upon the solvent which is present. Distillation may preferably be effected in two steps. In the first step a major portion to substantially all of the solvent (typically 90%–95% or more) may be evaporated from the extract. In the preferred embodiment, the first distillation step may be effected in a pot still or in a flash drum or in a distillation tower. The extract residue now substantially entirely stripped of solvent may then be further distilled to recover the desired flavor-bearing fraction free of solvent.

Attainment of the product flavor-bearing fraction containing less than about 0.5% solvent may be effected by distilling the extract residue at ambient temperature e.g. 60° F.–105° F. at a moderate vacuum of, e.g. 10–20 mm. Hg. Preferably distillation will take place from a thin film of e.g. less than about 1 mm. thickness. This may be effected in a molecular still or in other falling film evaporators.

The flavor-bearing fraction obtained from the distillation step(s) may contain less than 0.5% solvent and be substantially free, i.e. contain less than 1% caffeine. It may contain about 2% essential aromatic flavor in a vehicle of 98% non-flavor oil. It will be noted that prior art techniques commonly employed to get flavor-bearing fractions may contain only 0.5% or typically much less of essential aromatic flavor, and thus this amount of oily vehicle will be considered as a minimum amount.

It is particularly significant that the essential aromatic flavor in the flavor-bearing fraction is characterized by unique properties. When a beverage is prepared from a soluble coffee which has been enriched by addition of the fraction prepared by the above technique, the resulting beverage is characterized by a cup flavor associated with brewed coffee rather than by a flavor associated with a soluble coffee.

It is a particular feature of the essential aromatic flavor of the flavor-bearing fraction of this invention that it is substantially non-volatile at temperature less than 50° C. at 10 microns' pressure. It is known that prior art materials intended for use in the same manner are quite volatile at temperatures much less than 50° C. at 10 micron's pressure. For example, the essential aromatic flavor contained in oil which has been expressed from coffee may be substantially entirely volatized at 25° C. at 10 microns. This thermal behavior, together with other properties, clearly indicates that the essential aromatic flavor in the flavor-bearing fraction of this invention is unexpectedly different from essential aromatic flavors in prior art flavor-bearing fractions.

If it be desired to recover the essential aromatic flavor from the flavor-bearing fraction, this may be done by separation in a distillation type operation. Commonly a centrifugal molecular still may be employed. The liquid may impinge on a rotating rotor at rotor temperature of 230° F.–464° F. A light distillate in amount of about 2% of the charge, condensed against liquid nitrogen, may include substantially all of the essential aromatic flavor. A heavy distillate, typically in amount of about 80% of the charge, may include the non-aromatic oils. The light distillate, if desired, may be blended with expressed coffee oil and then added to soluble coffee. 18% of the charge may be bottoms.

Although as hereinbefore noted, this invention may be practiced in various pieces of apparatus, one preferred form of this apparatus is set forth in the drawing.

A percolator 10 may contain a bed or column of ground roasted coffee 11 which may have been admitted to the percolator through line 12 and valve 13. Leading to percolator 10 may be feed water line 14, feed water accumulator 15, line 16, and valve 17 through which water may pass to percolator 10. Line 16 may terminate at a plurality of points 18, 19, 20, 21, and 22 along percolator 10. The percolator may bear line 23 through which coffee may be withdrawn from percolator 10 when valve 24 is opened.

An aroma-extracting solvent may be maintained in accumulator 25 for passage through line 26 and valve 27 to percolator 10. Solvent outlet from percolator 10 may be through line 28 containing valve 29 permitting passage of solvent to extract drum 30. The extract may be passed through line 31, pump 32, drier 33, filter 34, line 35, and heat exchanger 36, heated by heating fluid in line 37, before entering flash tower 38. Tower 38 may bear overhead line 39 and condenser 40 cooled by cooling medium in line 41. Condensate from condenser 40 may be collected in accumulator 42. Solvent may be returned through pump 43 and line 44 to accumulator 25. Flash tower 38 may bear bottom line 45 from which the product may be withdrawn.

Liquid in line 45 may be passed to molecular still 46 bearing solvent return line 47 and product line 48. Product in line 48 may be further passed to molecular still 49 which bears line 50 from which light product may be withdrawn and line 51 from which heavy product may be withdrawn.

In practice of a preferred embodiment with this invention in the apparatus set forth in the drawing, 100 parts per weight of ground (to percolator grind) roasted coffee may be placed in bed 11 in percolator 10. Coffee inlet valve 13 in line 12 may be then closed and 100 parts of water admitted through line 14, accumulator 15, line 16, and valve 17 to the bed 11 of coffee. Water lines 18 through 22 permit even distribution of the water throughout the bed. The bed may be allowed to stand in contact with the 60° F. water for a period of one half hour. Substantially all the water may be retained in the bed.

Petroleum ether having a boiling range of 68° F.–104° F. may then be passed from accumulator 25 through line 26 and valve 27 to bed 11 in column 10. In this example the petroleum ether may contain water in amount to saturate the ether. Petroleum ether may be passed through bed 11 and thence through valve 29 and line 28 to accumulator 30. Total amount of petroleum ether solvent employed was 125 parts for the 100 parts by dry weight of coffee in the bed.

The petroleum ether extract collected in drum 30 contained the flavor-bearing fraction from the ground roasted coffee in amount of 3.5%. This extract was withdrawn from accumulator 30 and passed through line 31 and pump 32 through drier 33 containing anhydrous sodium sulfate, thereby lowering the moisture content of the extract. The extract was then passed through filter 34 which removed any small quantity of solids which may have been carried along. The filtered extract containing the desired flavor-bearing fraction may then pass through line 35 to heat exchanger 36, wherein it was heated by hot water in line 37. The heated extract was then flashed at pressure of 70–100 mm. Hg in flash tower 38. The solvent may be recovered as overhead in line 39, condensed in condenser 40 against cooling fluid in line 41, and collected in condensate accumulator 42. Bottoms from flash tower 38 which may be the flavor-bearing fraction of coffee containing less than about 2% solvent, may be recovered through line 45.

Solvent recovered in accumulator 42 (which will be moist solvent) may be passed through pump 43 and line 44 to solvent accumulator 25.

The flashed flavor-bearing fraction in line 45 may be further denuded of solvent by passage to molecular still 46 which in this embodiment may be a Consolidated Electrodynamics Centrifugal Molecular Still modified to operate at 10–20 mm. Hg by use of a water aspirator in place of the standard mechanical pump. The rotor was at temperature of about 70° F. Solvent recovered through line 47 may be recycled through line 47 and the desired product flavor-bearing fraction may be recovered in line 48 in amount of 3.5 parts. The flavor-bearing fraction recovered through line 48 in amount of 3.5 parts per 100 parts of dry charge coffee was mixed with 234 parts by weight of a soluble coffee and the resulting mixture was made into a coffee beverage. Testing of this coffee beverage indicated that it was consistently, uniformly preferred by a large number of people. It was particularly found to be desirable because it possessed a brew-like flavor, i.e. one very closely resembling a beverage prepared from brewed coffee.

Although it is not necessary, it is preferred to separate the essential aromatic flavor from the inert materials in the flavor-bearing fraction, and this may be accomplished if desired by passing the material in line 48 to a second centrifugal molecular still 49 operating at pressure of 5–10 microns at 200° C. The desired essential aromatic flavor may be recovered in line 50 as a light distillate and as a heavy distillate and the residue through line 51. The light distillate flavor in line 50 may be added to an aqueous extract of coffee which is to be dried, the resultant soluble coffee being characterized by a flavor which is substantially identical to freshly brewed coffee.

Although there is hereindescribed a specific embodiment of this invention, it will be apparent to those skilled-in-the-art that various changes and modifications may be made within the scope of this invention.

We claim:

1. The method of obtaining from roasted coffee a flavor-bearing fraction substantially free of caffeine and containing a minimum of non-aromatic oil which comprises wetting coffee with sufficient aqueous wetting liquor to saturate the bed of coffee and to form a superficially dry bed, said aqueous wetting liquor being selected from the group consisting of water and coffee extract, said aqueous wetting liquor being at a temperature of 32°–125° F., contacting the wetted coffee with sufficient flavor-extracting solvent, said solvent being a non-polar organic liquid having a boiling point below about 160° F., a substantial insolubility in water, a low solubility for water and a low solubility for caffeine under the conditions of extraction to extract from the coffee a flavor-bearing fraction substantially free of caffeine and containing a minimum of non-aromatic oil and recovering flavor-bearing fraction from said extract.

2. The method of claim 1 wherein said aqueous wetting liquor contains an activating composition selected from the group consisting of ammonia, ammonium hydroxide, and methyl acetate.

3. The method of claim 1, wherein said flavor extracting solvent is a low molecular weight liquid aliphatic hydrocarbon.

4. The method of claim 1 wherein said flavor extracting solvent is methyl chloride.

References Cited in the file of this patent

UNITED STATES PATENTS

| | | |
|---|---|---|
| 1,292,458 | Hamor et al. | Jan. 28, 1919 |
| 1,365,443 | Anholtzer | Jan. 11, 1921 |
| 1,367,724 | Trigg | Feb. 8, 1921 |
| 2,542,119 | Cole | Feb. 20, 1951 |
| 2,563,233 | Gilmont | Aug. 7, 1951 |

OTHER REFERENCES

"Coffee the Beverage," 1925, by Foot, the Spice Mill Pub. Co., N.Y., page 77.